(12) United States Patent
Zhang et al.

(10) Patent No.: US 8,110,677 B2
(45) Date of Patent: Feb. 7, 2012

(54) **MICROWAVE-ASSISTED EXTRACTION OF POLYSACCHARIDE FROM *ARTEMISIA SPHAEROCEPHALA***

(75) Inventors: Ji Zhang, Lanzhou (CN); Junlong Wang, Lanzhou (CN); Yiqian Wu, Lanzhou (CN); Jian Yao, Lanzhou (CN); Yunpu Wang, Lanzhou (CN); Junyu Liang, Lanzhou (CN); Yanan Zhang, Lanzhou (CN); Xiaodong Wang, Lanzhou (CN); Xiaoqing Xu, Lanzhou (CN)

(73) Assignee: Northwest Normal University, Lanzhou, Gangsu (CN)

( * ) Notice: Subject to any disclaimer, the term of this patent is extended or adjusted under 35 U.S.C. 154(b) by 219 days.

(21) Appl. No.: 12/391,587

(22) Filed: Feb. 24, 2009

(65) Prior Publication Data
US 2009/0216007 A1    Aug. 27, 2009

(30) Foreign Application Priority Data
Feb. 26, 2008    (CN) .......................... 2008 1 0007516

(51) Int. Cl.
*C07H 1/08* (2006.01)
*C07H 1/06* (2006.01)
*C08B 37/00* (2006.01)

(52) U.S. Cl. .................. 536/128; 536/124; 536/123.1; 536/55.1; 536/55.3; 514/54

(58) Field of Classification Search .................. 536/128, 536/124, 123.1, 55.1, 55.3; 514/54
See application file for complete search history.

(56) References Cited

FOREIGN PATENT DOCUMENTS

| | | |
|---|---|---|
| CN | 1107075 A | 8/1995 |
| CN | 1109028 A | 9/1995 |
| CN | 1246320 A | 3/2000 |
| CN | 200510002228.5 | 8/2005 |
| CN | 1246320 C | 3/2006 |
| CN | 1880342 A  * | 12/2006 |
| CN | 1880342 A | 12/2006 |

OTHER PUBLICATIONS

Zhang et al. (Swiss Med Wkly 2006; 136:529-532).*
Yang; CN 1880342 A; Dec. 20, 2006 (abstract).*

* cited by examiner

*Primary Examiner* — Shaojia Anna Jiang
*Assistant Examiner* — Michael C Henry
(74) *Attorney, Agent, or Firm* — Scully, Scott, Murphy & Presser, P.C.

(57) ABSTRACT

This invention relates to a method of extracting crude polysaccharide by microwave-assisted from *Artemisia sphaerocephala* seed de-oiling dregs. In particular, the invention comprising: microwave-assisted extraction, enzymatic hydrolysis, dialysis et. al. It provides a technique whereby the polysaccharide can be extracted effectively, in a relatively short period of time (20-30 min) with respect to conventional extraction methods and allows for an enhanced extraction yield (more than 30%). Furthermore, the invention also allows for the extraction of material with less solvent consumption, good reproducibility, excellent solubility, energy conservation, environmental protection, and showed great potential for efficient sample preparation and large-scale industrial application in the near future. With great resource advantage of *Artemisia sphaerocephala* in China, the invention has bright perspectives in promoting local economic development.

1 Claim, 2 Drawing Sheets

MICROWAVE-ASSISTED EXTRACTION OF POLYSACCHARIDE FROM *ARTEMISIA SPHAEROCEPHALA*

BACKGROUND OF THE INVENTION

1. Technical Field

This invention relates to a method of extracting polysaccharide. In particular, the invention provides a technique whereby the crude polysaccharide can be extracted by microwave-assisted from *Artemisia sphaerocephala* seed de-oiling dregs.

2. Background

*Artemisia sphaerocephala* Krasch (Asteraceae) is widely distributed in desert areas in the north of China. The content of polysaccharide is about 20% in *Artemisia sphaerocephala* seed. It can absorb 60 times water as the weight of itself, with the high viscosity, which is 1800 times that of gelatin, can be applied widely in different fields, such as chemical industry, food industry and ecology. *Artemisia sphaerocephala* polysaccharide (ASP) can reduce hyperglycemia, change glucose into glycogen; recover the destructed pancreatic cell, enhance the physical antioxidant function; decrease glutamic oxaloacetic transminase (GOT), glutamic pyruvic transaminase (GPT), blood urea nitrogen (BUN) in blood and protect the hepar and kidney, see China patent ZL200510002228.5.

The most conventional method for extraction of ASP from *Artemisia sphaerocephala* is hot water extraction. The disadvantages of the methods are: time-consuming, higher energy consumption, lower polysaccharide yield and high cost.

The main advantages of microwave-assisted extraction are the considerable reduction in time and solvent as compared to conventional techniques. Microwave technique is a kind of environment-friendly, green manufacturing technology which generate 2.45 billion times/s of ultra-high frequency concussion. Microwave energy penetrates materials and produces a volumetrically distributed heat source due to molecular friction resulting from dipolar rotation of polar solvents and from the conductive migration of dissolved ions. The highly localized temperature and pressure can cause selective migration of target compounds from the material to the extraction solvent at a more rapid rate and with similar or better recoveries compared with conventional heat-flux extraction.

Microwave-assisted extraction technique is developed for the extraction of polysaccharide and polyphenolic compounds from green tea. The yield of polysaccharide was 30%-45% with the microwave power of 500 W-1500 W, see China patent CN 1107075C. Astragalus polysaccharide is extracted with the polysaccharide yield of 9%-20% by microwave-assisted method (microwave power of 200 W), see China patent CN 1880342A. China patent CN 1246320 C describes a microwave-assisted extraction method of matrine which have the content of 0.22%. The microwave intensity is 12-36 W/L in the appearance of polarity organic solvent. Ginkgo flavone and ginkgolide are extracted using microwave-assisted method in organic solvent/water mixture at the microwave power of 500 W-1500 W. The yields of ginkgo flavone and ginkgolide are 38%-40% and 10%-12%, respectively, see China patent CN 1109028C. The effective components are extracted from glycyrrhiza with microwave-assisted method. The yield of crude extract is about 20% in the microwave intensity of 30-70 W/g, see China patent CN 128764C.

So far, no literatures or patents refer to microwave-assistant extraction of natural polysaccharide from discarded *Artemisia sphaerocephala* seed de-oiling dregs.

SUMMARY

The invention relates to a process for the manufacture of polysaccharide with microwave-assistant from *Artemisia sphaerocephala*. In accordance with the invention, an extraction protocol for polysaccharide can be performed when a microwave applicator is used to generate a sudden temperature increase inside of the materials, e.g. the gland system of plant material, that is contacted with an appropriate quantity of a selected extraction medium that is (a) transparent to microwave so as to keep the environment that surrounds the material cold with respect to the internal temperature of the material itself, or (b) partially transparent where some warming is permissible or desirable. The invention provides a green manufacturing technique whereby the natural polysaccharide can be extracted effectively, in a relatively short period of time, less energy consumption with respect to conventional extraction methods and allows for an enhanced extraction yield.

The main objective of the invention is to provide a microwave-assistance process for the extraction of polysaccharide from *Artemisia sphaerocephala*.

The first step: *Artemisia sphaerocephala* seed powder was obtained by $CO_2$ supercritical fluid extraction of oil. The said powder was mixed with distilled water. The ratio of the mixture was 1:30-1:50 (w/w). The suspension was irradiated with microwaves in microwave extraction equipment with water condenser. The overall microwave power was 600 W-800 W with the frequency of 915 MHz for 20-30 min at the temperature of 70-80° C. The extraction product may be recovered from the extractant after separation from the solids material as filtering at the pressure of 0.07-0.08 MPa. Distilled water was evaporated off from the resulting solvent extract at the pressure of 0.06-0.08 MPa, and the total volume of the extraction was reduced to ⅛-¼ of original. Ethanol was then added in concentrated extract (ethanol content was about 70%-80% (v/v) in total extract). The precipitate in ethanol solution was then collected by centrifugation at the centrifugal speed of 3500-4000 rpm after stored in static condition for 20-30 h. The said collected precipitate was freeze-drying for 24-36 h at the temperature of −60-−50° C. with the pressure of 1 Pa, get material A.

The second step: Material A was dissolved in distilled water, the ratio of the mixture was 1:150-1:200 (w/w). The aqueous solution of extract was incubated with 6 u-8 u/100 ml papain for 10-12 h after heated at the temperature of 60-70° C. The said extract was purified by butanol/chloroform (1:2-1:4, v/v) for 3-6 times. The solution in aqueous phase was collected and concentrated to ⅛-¼ of original volume at the temperature of 40-50° C., 0.06-0.08 Mpa, get material B.

The third step: The pH value of material B was adjusted to 9 by adding ammonia. The solution of extract was decolorizated by dropping 20%-30% $H_2O_2$ until the color of the said solution turned to colorless. The said colorless solution was concentrated to ⅛-¼ of original volume at the pressure of 0.06-0.08 Mpa. The concentrated solution was then dialyzed (Mw cut off 8000-14000 Da) against distilled water for 36-48 h. Ethanol was added in extract solution (ethanol content was about 70%-80% (v/v) in total extract) after dialysis. The precipitate in ethanol solution was then collected by centrifugation at the centrifugal speed of 3500-4000 rpm after stored in static condition for 10-14 h. The said collected precipitate was freeze-drying for 24-36 h at the temperature of −60-−50° C. with the pressure of 1 Pa, get purified ASP.

UV-spectroscopic analysis: the purified ASP was scanned by UV, no absorbance near 280 nm was detected, indicating that protein contamination in the ASP solution was undetectable. Ninhydrin reaction, iodine-potassium iodide reaction and biuret reaction were all negative, indicating that no protein or starch was detected. In IR spectrum of purified ASP the following characteristic bands are observed: band at 3425 cm$^{-1}$ corresponding to the vibration of valence for OH groups; a band at 2931 cm$^{-1}$ attributed to $CH_2$ groups. Fehling reaction and sulfuric acid/phenol reaction were positive, indicating that ASP was a kind of reductive polysaccharides. The appearance of purified ASP was white powder composed of L-Ara, D-Xyl, D-Lyx, D-Man, D-Glu and D-Gal with the molar ratio of 1:5:2:28:4:14.

This invention relates to a novel method of extracting crude polysaccharide from *Artemisia sphaerocephala* using microwave equipment as energy source. In particular, the invention provides a technique whereby the polysaccharide can be extracted effectively, in a relatively short period of time (20-30 min) with respect to conventional extraction methods and allows for an enhanced extraction yield (more than 30%). Furthermore, the invention also allows for the extraction of material with less solvent consumption, good reproducibility, energy conservation and environmental protection, and showed great potential for efficient sample preparation and large-scale industrial application in the near future. With great resource advantage of *Artemisia sphaerocephala* in China, the invention has bright perspectives in promoting local economic development.

DESCRIPTION OF DRAWINGS

Having thus generally described the invention illustrated a preferred embodiment.

DETAILED DESCRIPTION

Figure 1:
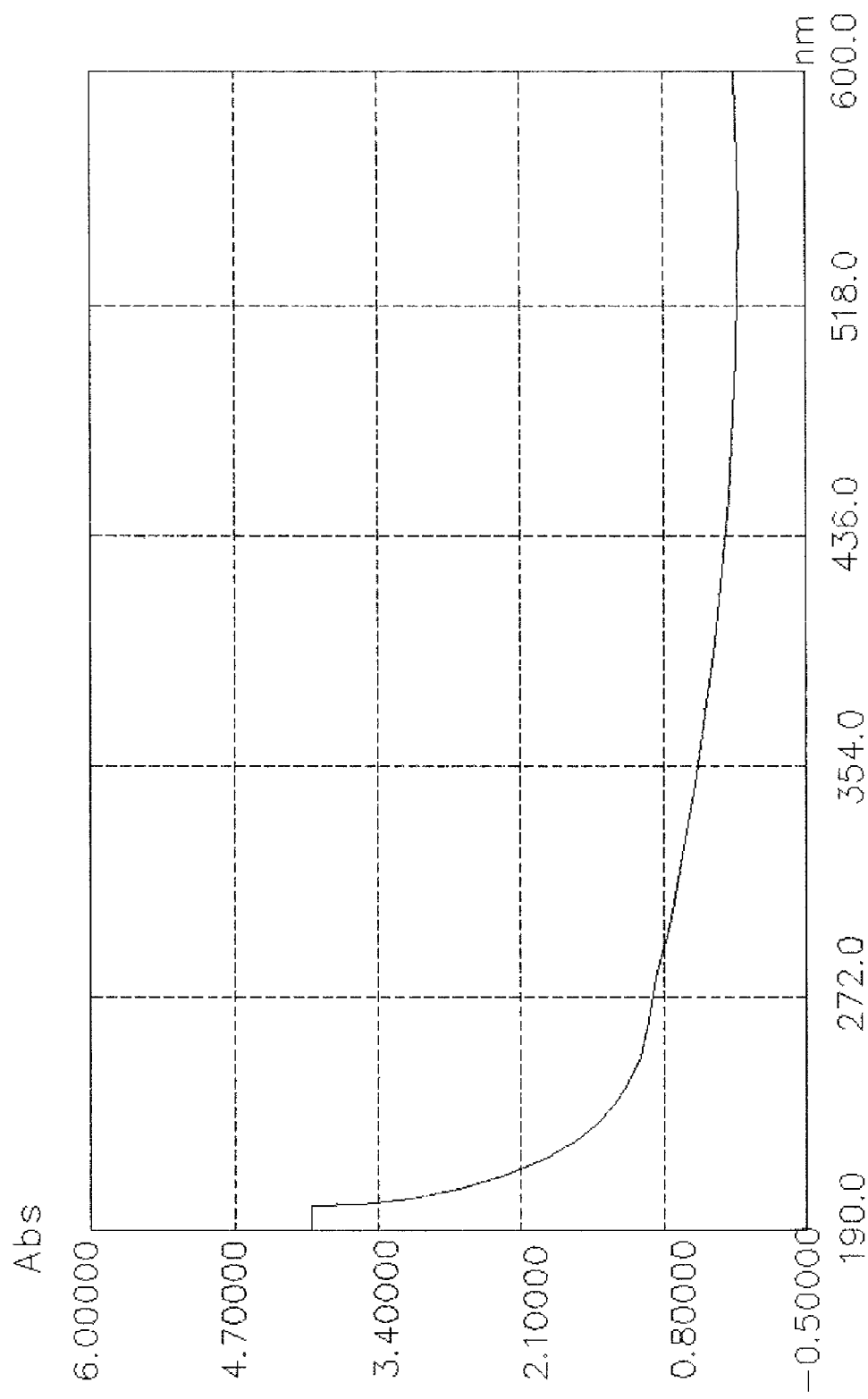
FIG. 1. UV spectra of ASP in this invention.
Figure 2:
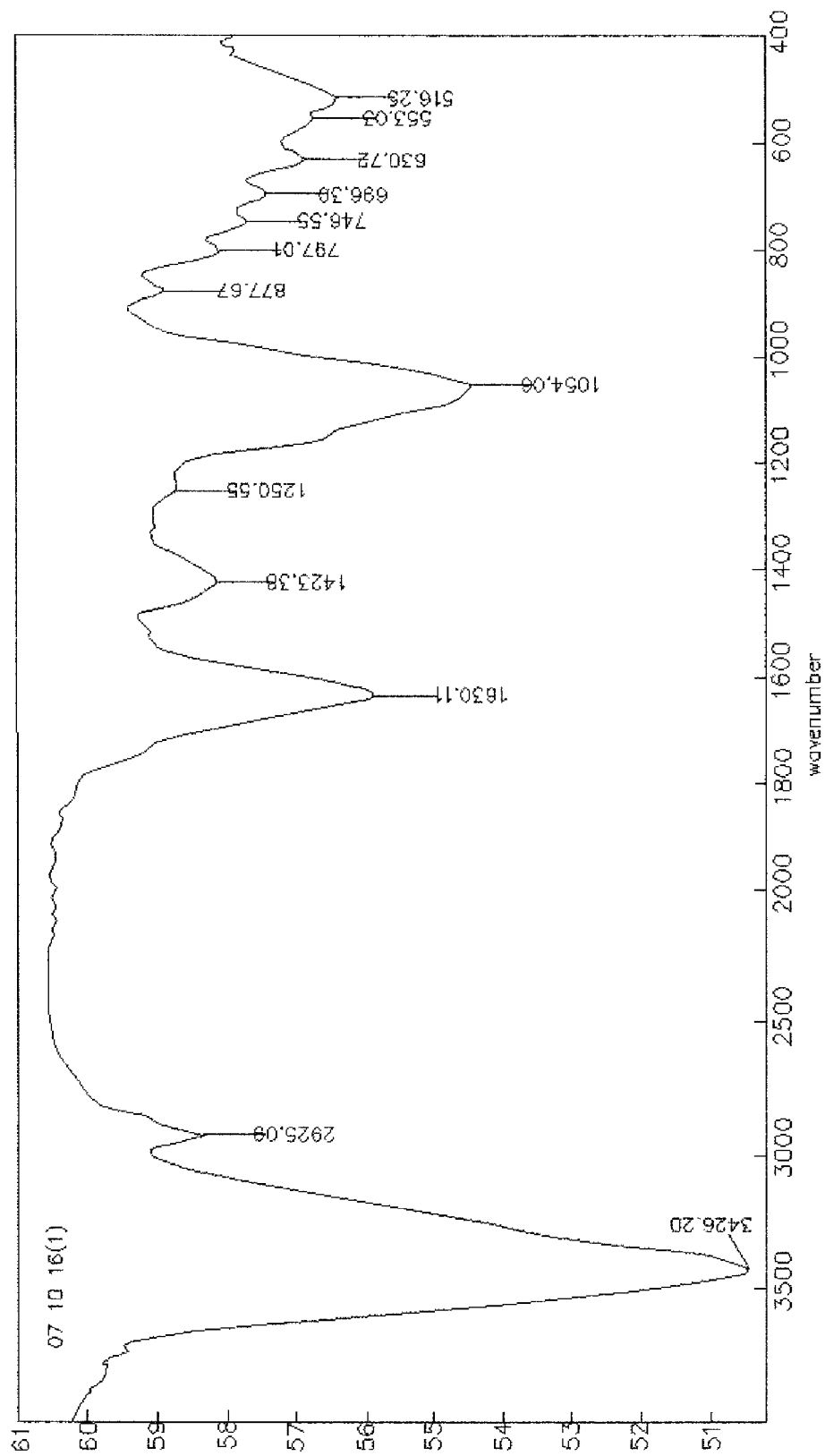
FIG. 2. IR spectra of ASP in this invention.

The following examples will illustrate the invention but the invention is not restricted to these examples.

EXAMPLE 1

The first step: *Artemisia sphaerocephala* seed powder was obtained by $CO_2$ supercritical fluid extraction of oil. The said powder was mixed with distilled water. The ratio of the mixture was 1:30 (w/w). The suspension was irradiated with microwaves in microwave extraction equipment with water condenser. The overall microwave power was 700 W with the frequency of 915 MHz for 25 min at the temperature of 75° C. The extraction product may be recovered from the extractant after separation from the solids material as filtering at the pressure of 0.07 MPa. Distilled water was evaporated off from the resulting solvent extract at the pressure of 0.06 MPa, and the total volume of the extraction was reduced to ⅛ of original. Ethanol was then added in concentrated extract (ethanol content was about 70% (v/v) in total extract). The precipitate in ethanol solution was then collected by centrifugation at the centrifugal speed of 3500 rpm after stored in static condition for 30 h. The said collected precipitate was freeze-drying for 24 h at the temperature of −60° C. with the pressure of 1 Pa, get material A.

The second step: Material A was dissolved in distilled water, the ratio of the mixture was 1:150 (w/w). The aqueous solution of extract was incubated with 6 u/100 ml papain for 12 h after heated at the temperature of 60° C. The said extract was purified by butanol/chloroform (1:3, v/v) for 3 times. The solution in aqueous phase was collected and concentrated to 1/10 of original volume at the temperature of 40° C., 0.06 Mpa, get material B.

The third step: The pH value of material B was adjusted to 9 by adding ammonia. The solution of extract was decolorizated by dropping 20% $H_2O_2$ until the color of the said solution turned to colorless. The said colorless solution was concentrated to ⅛ of original volume at the pressure of 0.06 Mpa. The concentrated solution was then dialyzed (Mw cut off 8000-14000 Da) against distilled water for 36 h. Ethanol was added in extract solution (ethanol content was about 70% (v/v) in total extract) after dialysis. The precipitate in ethanol solution was then collected by centrifugation at the centrifugal speed of 3500 rpm after stored in static condition for 10 h. The said collected precipitate was freeze-drying for 24 h at the temperature of −60° C. with the pressure of 1 Pa, get purified ASP.

EXAMPLE 2

The first step: *Artemisia sphaerocephala* seed powder was obtained by $CO_2$ supercritical fluid extraction of oil. The said powder was mixed with distilled water. The ratio of the mixture was 1:40 (w/w). The suspension was irradiated with microwaves in microwave extraction equipment with water condenser. The overall microwave power was 600 W with the frequency of 915 MHz for 30 min at the temperature of 70° C. The extraction product may be recovered from the extractant after separation from the solids material as filtering at the pressure of 0.08 MPa. Distilled water was evaporated off from the resulting solvent extract at the pressure of 0.07 MPa, and the total volume of the extraction was reduced to ⅙ of original. Ethanol was then added in concentrated extract (ethanol content was about 75% (v/v) in total extract). The precipitate in ethanol solution was then collected by centrifugation at the centrifugal speed of 400 rpm after stored in static condition for 25. The said collected precipitate was freeze-drying for 36 h at the temperature of −50° C. with the pressure of 1 Pa, get material A.

The second step: Material A was dissolved in distilled water, the ratio of the mixture was 1:250 (w/w). The aqueous solution of extract was incubated with 8 u/100 ml papain for 11 h after heated at the temperature of 65° C. The said extract was purified by butanol/chloroform (1:4, v/v) for 5 times. The solution in aqueous phase was collected and concentrated to 1/11 of original volume at the temperature of 45° C., 0.07 Mpa, get material B.

The third step: The pH value of material B was adjusted to 9 by adding ammonia. The solution of extract was decolorizated by dropping 25% $H_2O_2$ until the color of the said solution turned to colorless. The said colorless solution was concentrated to ⅙ of original volume at the pressure of 0.07 Mpa. The concentrated solution was then dialyzed (Mw cut off 8000-14000 Da) against distilled water for 48 h. Ethanol was added in extract solution (ethanol content was about 75% (v/v) in total extract) after dialysis. The precipitate in ethanol solution was then collected by centrifugation at the centrifugal speed of 400 rpm after stored in static condition for 12 h. The said collected precipitate was freeze-drying for 36 h at the temperature of −55° C. with the pressure of 1 Pa, get purified ASP.

EXAMPLE 3

The first step: *Artemisia sphaerocephala* seed powder was obtained by $CO_2$ supercritical fluid extraction of oil. The said powder was mixed with distilled water. The ratio of the mixture was 1:50 (w/w). The suspension was irradiated with microwaves in microwave extraction equipment with water condenser. The overall microwave power was 800 W with the frequency of 915 MHz for 20 min at the temperature of 80° C. The extraction product may be recovered from the extractant after separation from the solids material as filtering at the pressure of 0.09 MPa. Distilled water was evaporated off from the resulting solvent extract at the pressure of 0.08 MPa, and the total volume of the extraction was reduced to ¼ of original. Ethanol was then added in concentrated extract (ethanol content was about 80% (v/v) in total extract). The precipitate in ethanol solution was then collected by centrifugation at the centrifugal speed of 4500 rpm after stored in static condition for 20 h. The said collected precipitate was freeze-drying for 30 h at the temperature of −55° C. with the pressure of 1 Pa, get material A.

The second step: Material A was dissolved in distilled water, the ratio of the mixture was 1:200 (w/w). The aqueous solution of extract was incubated with 7 u/100 ml papain for 10 h after heated at the temperature of 70° C. The said extract was purified by butanol/chloroform (1:2, v/v) for 6 times. The solution in aqueous phase was collected and concentrated to 1/12 of original volume at the temperature of 50° C., 0.08 Mpa, get material B.

The third step: The pH value of material B was adjusted to 9 by adding ammonia. The solution of extract was decolorizated by dropping 30% $H_2O_2$ until the color of the said solution turned to colorless. The said colorless solution was concentrated to ¼ of original volume at the pressure of 0.08 Mpa. The concentrated solution was then dialyzed (Mw cut off 8000-14000 Da) against distilled water for 42 h. Ethanol was added in extract solution (ethanol content was about 80% (v/v) in total extract) after dialysis. The precipitate in ethanol solution was then collected by centrifugation at the centrifugal speed of 4500 rpm after stored in static condition for 14 h. The said collected precipitate was freeze-drying for 30 h at the temperature of −50° C. with the pressure of 1 Pa, get purified ASP.

For comparative purposes, the crude polysaccharide was obtained by hot water extraction for 12 h with yields of about 14.6% based on freeze-drying.

TABLE 1

Comparison between microwave-assistant extraction and conventional extraction

| Experiment No. | ratio of material | Extraction Time (min) | Extraction temperature (° C.) | Microwave power (W) | Yield (%) |
|---|---|---|---|---|---|
| Example 1 | 1:30 | 25 | 75 | 700 | 35 |
| Example 2 | 1:40 | 30 | 70 | 600 | 34.3 |
| Example 3 | 1:50 | 20 | 80 | 800 | 30.8 |
| Hot-water extraction | 1:50 | 720 | 70 | — | 14.6 |

What is claimed is:

1. A process for obtaining purified *Artemisia sphaerocephala* polysaccharide with microwave-assistance, comprising:
   a) contacting *Artemisia sphaerocephala* seed powder with supercritical $CO_2$ to obtain an oil-extracted powder; contacting the oil-extracted powder with distilled water at a ratio of 1:30 to 1:50 (w/w) to obtain a suspension; exposing the suspension to microwaves of a frequency of 915 MHz and overall power of 600 W to 800 W in a microwave extraction apparatus comprising a water condenser, thereby obtaining an extractant; filtering the extractant at a pressure of 0.07 to 0.09 MPa to obtain a filtrate; subjecting the filtrate to a pressure of 0.06 to 0.08 MPa to reduce the total volume of the filtrate by ¾ to ⅞, thereby obtaining a concentrate; contacting the concentrate with ethanol to obtain a concentrated extract which comprises about 70 to 80% ethanol (v/v); centrifuging the concentrated extract at 3500 to 4000 rpm to obtain a precipitate; and subjecting the precipitate to a pressure of 1 Pa and a temperature of −60 to −50° C. for 24 to 36 hours to obtain material A;
   b) i) contacting material A with distilled water at a ratio of 1:150 to 1:200 (w/v) to obtain an aqueous solution;
      ii) heating the aqueous solution at a temperature of 60 to 70° C. and then incubating with 6μ-8μ/100ml papain for 10 to 12 hours;
      iii) contacting the aqueous solution with a preparation of butanol and chloroform wherein the butanol:chloroform ratio is 1:2 to 1:4 (v/v);
      iv) recovering the aqueous phase;
      v) repeating steps iii) and iv) a further 3 to 6 times to prepare a final aqueous phase;
      vi) subjecting the final aqueous phase to a pressure of 0.06 to 0.08 MPa and a temperature of 40 to 50° C. to collect and concentrate the aqueous phase to ⅛ to ¼ of original volume, thereby obtaining material B; and
   c) contacting material B with ammonia to obtain a solution of pH 9; contacting the solution of pH 9 with a preparation of 20 to 30% $H_2O_2$ to obtain a colorless solution; subjecting the colorless solution to a pressure of 0.06 to 0.08 Mpa, thereby obtaining a concentrated solution; contacting one side of a semi-permeable membrane with the concentrated solution and another side of the semi-permeable membrane with distilled water, wherein the semi-permeable membrane has an average molecular weight cut-off of 8000 to 14000 Da, for 36 to 48 hours; adding ethanol to the dialyzed preparation to obtain an extract solution which comprises about 70 to 80% ethanol (v/v); centrifuging the extract solution at 3500 to 4000 rpm to collect a precipitate; and subjecting the collected precipitate to a pressure of 1 Pa and a temperature of −60 to −50° C. for 24 to 36 hours, thereby obtaining purified *Artemisia sphaerocephala* polysaccharide.

* * * * *